J. STURTEVANT & J. T. WEINZIERL.
BOTTLE CAP ASSEMBLING MACHINE.
APPLICATION FILED AUG. 18, 1913.

1,155,171.

Patented Sept. 28, 1915.
6 SHEETS—SHEET 1.

WITNESSES
J. Herbert Bradley
W. A. Hedeman

INVENTORS
Joseph T. Weinzierl
Julius Sturtevant
by O. M. Clarke
Atty.

J. STURTEVANT & J. T. WEINZIERL.
BOTTLE CAP ASSEMBLING MACHINE.
APPLICATION FILED AUG. 18, 1913.

1,155,171.

Patented Sept. 28, 1915.
6 SHEETS—SHEET 3.

J. STURTEVANT & J. T. WEINZIERL.
BOTTLE CAP ASSEMBLING MACHINE.
APPLICATION FILED AUG. 18, 1913.

1,155,171.

Patented Sept. 28, 1915.
6 SHEETS—SHEET 4.

WITNESSES

INVENTORS

J. STURTEVANT & J. T. WEINZIERL.
BOTTLE CAP ASSEMBLING MACHINE.
APPLICATION FILED AUG. 18, 1913.

1,155,171.

Patented Sept. 28, 1915.
6 SHEETS—SHEET 5.

WITNESSES
INVENTORS

UNITED STATES PATENT OFFICE.

JULIUS STURTEVANT AND JOSEPH T. WEINZIERL, OF NEW KENSINGTON, PENNSYLVANIA.

BOTTLE-CAP-ASSEMBLING MACHINE.

1,155,171.             Specification of Letters Patent.      Patented Sept. 28, 1915.

Application filed August 18, 1913. Serial No. 785,428.

*To all whom it may concern:*

Be it known that we, JULIUS STURTEVANT, a citizen of Germany, and JOSEPH T. WEINZIERL, a citizen of the United States, both residing at New Kensington, in the county of Westmoreland and State of Pennsylvania, have invented certain new and useful Improvements in Bottle-Cap-Assembling Machines, of which the following is a specification.

Our invention has for its object to provide a mechanism for automatically assembling the several parts of a bottle cap or stopper, or other similar device, and consists of means for forming the outer shell and inner disk from thin sheet metal from suitable blanks, means for directing the formed caps into position for assemblage with the inner disk and sealing cork, and for providing for the several necessary steps of the operation to complete the article and deliver it in shape for use.

The invention is utilized through apparatus and mechanism hereinafter more fully described, one preferred form being shown in the accompanying drawings, in which—

The apparatus as a whole comprises a press A for forming the caps from a sheet metal blank having the mechanism hereinafter described, and the guides or chutes for delivering the caps to the rotating table; the rotating table B; the disk-forming press C for cutting the inner metallic disks and for delivering them to the formed caps located in the pockets of the rotating table; the series of cork tubes D located in position for automatic delivery to the disk-filled caps; the series of thrusting or placing fingers E; suitable actuating mechanism for said parts; the delivery chutes F adapted to discharge the completely assembled caps from the machine, and the edge crimping machine H. While these parts are not entirely new *per se*, we shall, however, describe each sufficiently to make their construction and operation clear.

Referring to the cap-forming press A, this press, which is of a well-known construction, is adapted to feed a thin sheet metal blank *a* by means of feeding rolls 2, 2; 2, 2; between suitable guiding strips 3 on a table 4, the rolls 2 being actuated by ratchet mechanism 5 and suitable gearing 6. The ratchet mechanism is actuated by a pawl 7 which receives its motion from connecting rod 8 operated by crank disk 9 on the end of the main actuating shaft of the press A, as will be readily understood. By this means the blank sheet *a* is advanced a specified distance for each stroke of the press, the caps being punched and formed by the mechanism illustrated more fully in Fig. 8.

As the caps are formed by press A, they are carried along with the blank, each cap being positioned in the opening in the blank from which it was cut and formed, and is discharged by gravity downwardly into each one of a series of vertical chutes or guides 10, by which the caps are carried to a series of traveling endless belts 11 passing along over a supporting table $11^a$ underneath a series of individual guides 12, forming continuations of the guides 10, and supported from a suitable frame. The belts 11 pass over a supporting pulley 13 at one end of the machine, preferably mounted in bearings on press A, as shown, and around a similar driven pulley 14 mounted in suitable bearings on the foundation support of revolving table B and driven by a belt pulley 15 from any suitable driving mechanism, not shown. By this means the formed caps are carried along through the series of open bottom guides 12, preferably at a slight inclination, as shown, and are delivered into the downwardly inclined delivery guides 16 which terminate just above the top of the revolving table B having the series of receiving apertures or pockets $b$.

The caps are punched from the thin sheet metal blank $a$ by the die mechanism of the press A, the blank being fed between resilient fingers $a'$, $a'$, located at intervals across the working area of the press and mounted upon cross bars $a^2$ thereon.

The die mechanism for drawing the caps consists of the press A having alternately arranged co-acting lower and upper main dies, each of said dies having inner co-acting portions with suitable spring mechanism for effecting cushioning action, of well-known construction. These dies are arranged in staggered relation across the punching area and are adapted to punch the blank and form the caps by drawing the metal, in the manner illustrated in Fig. 9, with the edges extending downwardly and sliding on the surface of the table.

Figures 8, 9:
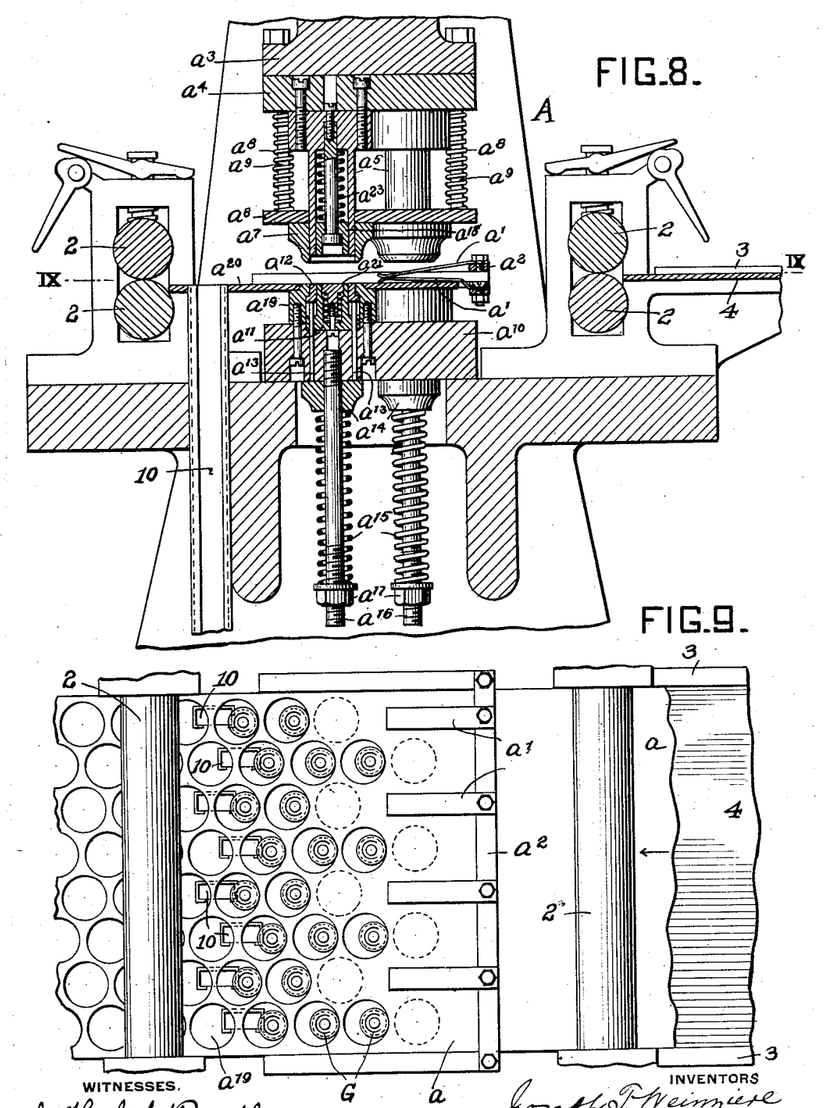
Fig. 8 is an enlarged vertical sectional view through a portion of the cap-forming press, taken on the line VIII. VIII. of Fig. 1.
Fig. 9 is a plan view of the cap-forming press on the working plane of the blank, indicated by the line IX. IX. of Fig. 8.

As shown in Fig. 8, $a^3$ is the ram of the press which is reciprocated from the main shaft of the press by any suitable crank or cam mechanism. To ram $a^3$ is bolted punch holder $a^4$ to which are attached the blanking punches $a^5$. The lower ends of these punches pass through stripper plate $a^6$ and through stripping collars $a^7$. The object of these is to strip the metal from the blanking punches on the return or up stroke of the press. This is done by springs $a^8$ around bolts $a^9$ which are so arranged as to have a limited vertical movement in punch holder $a^4$, but prevent springs $a^8$ from forcing the stripper plate and collars lower, in relation to the ends of the punches, than the position shown. Die shoe $a^{10}$ has mounted on it hub $a^{11}$ over which the shell is drawn, the hub being on the inside of the shell and punch $a^5$ being around it when formed. Around hub $a^{11}$ is floating ring $a^{12}$ which rests on pins $a^{13}$, and these in turn rest on washer $a^{14}$ which is pressed upward by spring $a^{15}$. Passing through washer $a^{14}$ and spring $a^{15}$ is stud $a^{16}$ held firmly in die shoe $a^{10}$ and having adjusting nut $a^{17}$ at its lower end designed to vary the tension of spring $a^{15}$. Surrounding floating ring $a^{12}$ is blanking die $a^{19}$ which projects through an opening cut in table $a^{20}$ and is in exact register with punch $a^5$.

It will be seen that when, on the down stroke of the press, punch $a^5$ strikes the metal over blanking die $a^{19}$ a circular blank is cut and held against the end of punch $a^5$ by floating ring $a^{12}$ pressed upward by the tension of spring $a^{15}$ acting through washer $a^{14}$ and pins $a^{13}$. Upon further descent of the punch, the metal surrounding hub $a^{11}$ and in contact with floating ring $a^{12}$ is forced inward to form the walls of the shell while the middle portion resting on the top of the hub forms the bottom. Nuts $a^{17}$ are adjusted to place sufficient tension on spring $a^{15}$ to prevent the side walls of the shell G from wrinkling. Upon further descent of the punch $a^5$, a cutting punch $a^{18}$, which is within punch $a^5$ and in register with the opening in hub $a^{11}$, cuts the partial peripheral slit $g'$ to form the middle attached tongue of the shell which is also corrugated when it is pressed between a pad $a^{21}$ and the end of cutting punch $a^{18}$. Cutting punch $a^{18}$ has a portion of its cutting edge removed where the tongue joins the rim of the shell. On the return stroke of the press, the shell is inside punch $a^5$ with its lower edge in contact with floating ring $a^{12}$ which carries it upward, stripping it from the outside of hub $a^{11}$. When floating ring $a^{12}$ reaches the limit of its upward travel the shell is still in punch $a^5$, but is ejected by sleeve ring $a^{22}$ acting as an ejector, actuated by spring $a^{23}$. The metal from which the blank was cut has been stripped from the blanking punches by stripping collars $a^7$ and is now held at the proper elevation by springs $a'$ and as it is fed forward carries the shell with it until chute 10 is reached, into which the shell falls and is carried to conveyer 11. Each cap G as thus punched is pressed into a cup form between the dies and is at the same time provided with a circumferential slit $g'$, concentric with the center, but for the major portion of the cap only, say for three-quarters of its circumference, leaving an integral neck $g^2$, as clearly shown in Figs. 2 and 3. The purpose of this construction is to provide a partly severed middle portion which may be torn out of the cap when it is in position on the bottle, thus permitting of the destruction and removal of the outer cap and releasing the inner sealing disk $c^2$ and cork disk $g^4$, of well-known type. The caps as thus formed lie on the flat upper surface of the die table by their edges and, as stated, are carried forward with the advancing blank $a$ to the gravity chutes or guides 10, the spring fingers $a'$ maintaining the blank sufficiently above the bottom surface to insure engagement with the formed cap, but not so high as to pass over the tops of the caps.

The rotating table B of the machine is revolubly mounted around a central stem or post 17 extending up from a foundation base $b'$ and carrying at its top the stationary central disk or platform $b^2$, around which the rotatable table B revolves. Said table is intermittently actuated by means of bevel gearing $b^3$, ratchet mechanism $b^4$, and connecting rod $b^5$, preferably having a safety cushioning connection $b^6$, and actuating eccentric $b^7$ driven from the main shaft $b^8$ of the disk press C. Table B is provided with a series of rows of transverse apertures $b$, each row being arranged across the surface in a straight line at an angle to the radial line of the table, whereby to provide for economy of space and utilization of the surface of the table B for the largest practicable number of apertures. These apertures $b$ are adapted to receive the formed caps as they roll down edgewise through the terminal conduit 16, as in Fig. 7, and are rectangular at one side and semi-circular at the other, the cross dimensions of the opening being practically the same in each direction. Immediately underneath the revoluble table B is a stationary supporting platform $b^9$, upon which the edges of the caps rest as they pass through openings $b$.

Figures 1, 2, 3:
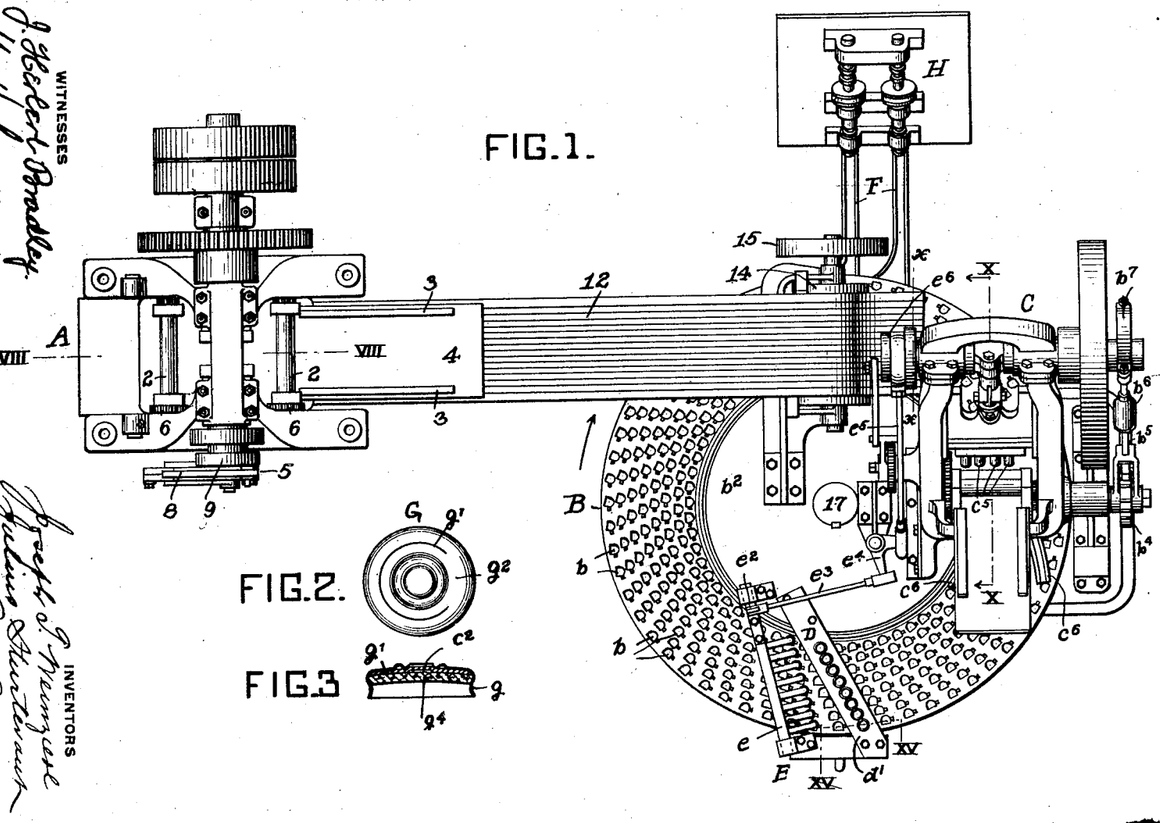
Figure 1 is a general plan view of the complete apparatus.
Figs. 2 and 3 are plan and cross sectional views respectively of the completed cap or stopper assembled.

As indicated in Fig. 1, the lower ends of the guides 16 correspond with the alinement of the apertures $b$, as each row thereof is brought into receiving position, by the actuating gearing of the disk press C, so that one cap is charged into each opening $b$ of each row simultaneously.

Figures 10, 11, 12:
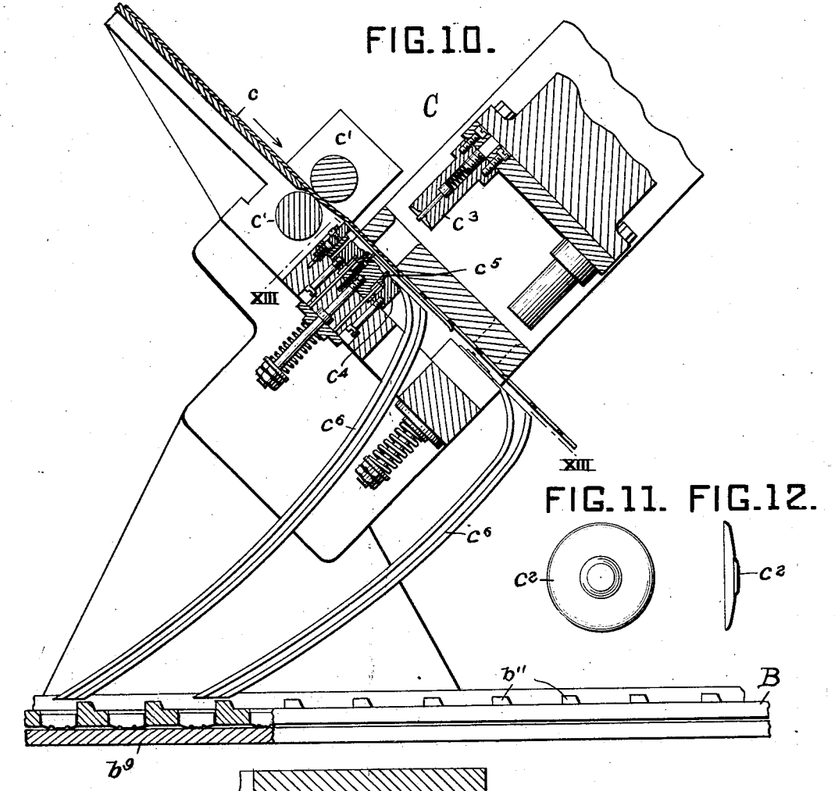
Fig. 10 is an enlarged sectional view of the disk-forming press taken on the line X. X. of Fig. 1.
Figs. 11 and 12 are face and cross sectional views respectively of the inner disk as formed by said press.
Figure 13:
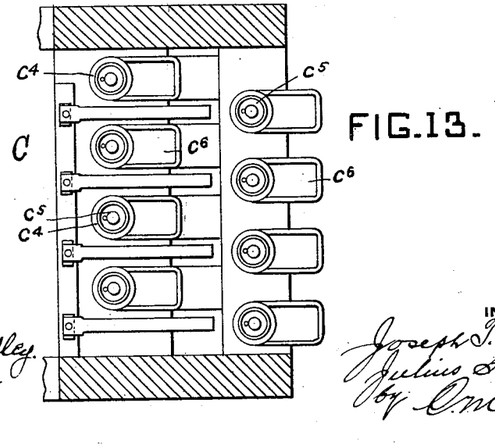
Fig. 13 is a plan view of the under portion of the disk-forming press, indicated by the line XIII. XIII. of Fig. 10.
Figure 14:
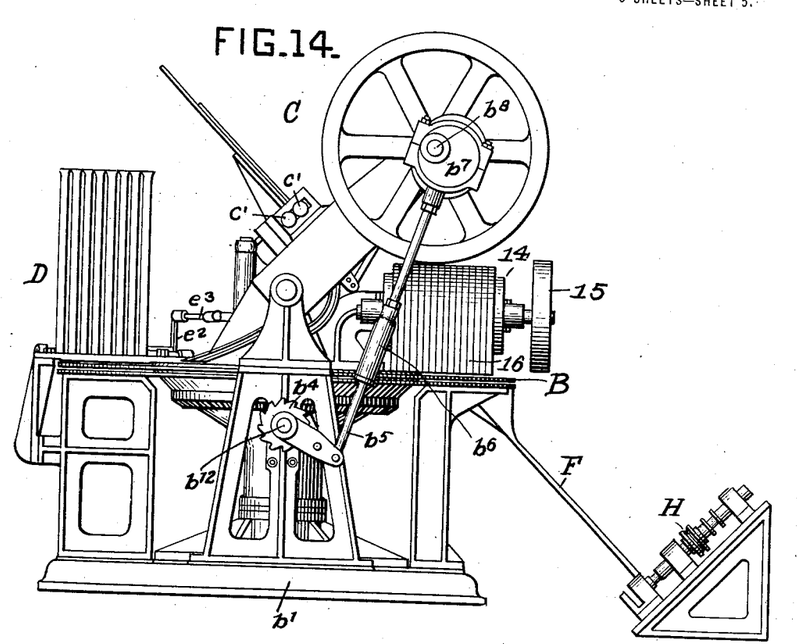
Fig. 14 is a view of the apparatus in end elevation, showing the disk-forming press and other parts of the machine.
Figures 15, 16, 17:
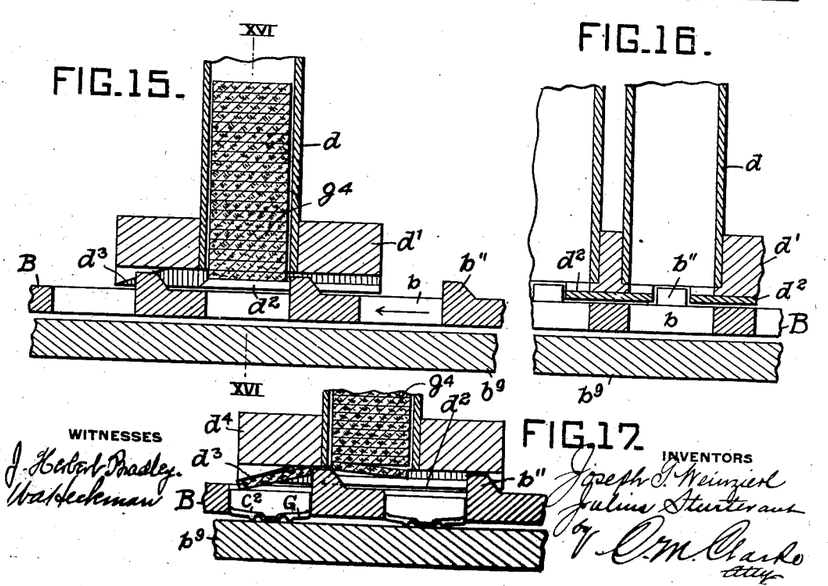
Fig. 15 is an enlarged detail sectional view through one of the sealing cork tubes, indicated by the line XV. XV. of Fig. 1.
Fig. 16 is a partial similar view at right angles to Fig. 15, indicated by the line XVI. XVI. of said figure.
Fig. 17 is a view similar to Fig. 15, showing the operation of placing the cork disk in position in the cap.

For the purpose of tipping the caps over upon their bottoms, a tapered slot $b^{10}$ is provided in the upper surface of the table $b^9$ in advance of the receiving position, indicated by the line $x$, $x$, Fig. 1, said slots being arranged in advance of and in alinement with the square end of each approaching aperture $b$, tapering upwardly toward the surface, and also inclining edgewise toward the semi-circular side of the opening. As the caps are moved around by the table B on their edges, they ride up in the grooves $b^{10}$ and are thrown over upon their bottoms, falling snugly into openings $b$, and in such position are brought around into registering position with the series of delivery chutes from the inner disk press C. This press, shown partly in detail in Fig. 10, is somewhat similar to the press A, except that it is adapted to punch and deliver the disks from the sheet metal blank, one at a time, immediately to the receiving caps, as the disks are made. For this purpose the blank $c$ is fed intermittently by means of feed rolls $c'$, $c'$, across the punching mechanism at any suitable inclination, say, 45°, the disks $c^2$ being punched from the blank by the series of punches $c^3$ and dies $c^4$ having suitable spring-actuating cushion and ejector mechanism $c^5$.

The disks are punched, like the caps, in alternating arrangement, and immediately in advance of each alternating punch are located the alternating curved guiding chutes $c^6$ adapted to receive the punched disks flatwise and to deliver them downwardly therethrough to the caps as punched, as indicated in Fig. 10. For this purpose the guides $c^6$ are directed downwardly and forwardly in the direction of movement of the rotating table B, terminating immediately above the top thereof, and in suitable position to discharge directly into the caps, it being understood that the lower terminals of the guides $c^6$, like the terminals of the cap guides 16, are arranged across the upper surface of the table so as to aline with the receiving caps in the apertures.

As will be observed, the crown of the disk as punched is uppermost, but in passing downwardly through the guides, the disks turn over and are deposited in the caps with the crown underneath, against the inner surface of the cap, as in Fig. 3. Due to the fact that there are two series of guides $c^6$, the terminals of which alternate in staggered arrangement, as do their upper receiving ends, the caps are charged with disks, not in a straight row across the table, but in two rows, the first row receiving one disk in each alternate opening, the row being filled when it reaches the position beyond, corresponding to the terminals of the next series of guides $c^6$.

For the purpose of charging the caps with the cork packing disks $g^4$, we provide a bank of tubes $d$ arranged above a supporting cross bar $d'$, there being one tube for each opening in each row of openings $b$ in table B, and for each cap therein, the series of tubes conforming to the alinement of the openings, as clearly shown in Fig. 1. These tubes are of sufficient height to contain an ample supply of the cork disks, being replenished from time to time, the corks falling by gravity, and the tubes being preferably slotted for all or a greater portion of their height at one side, permitting removal of the disks.

Figures 18, 19:
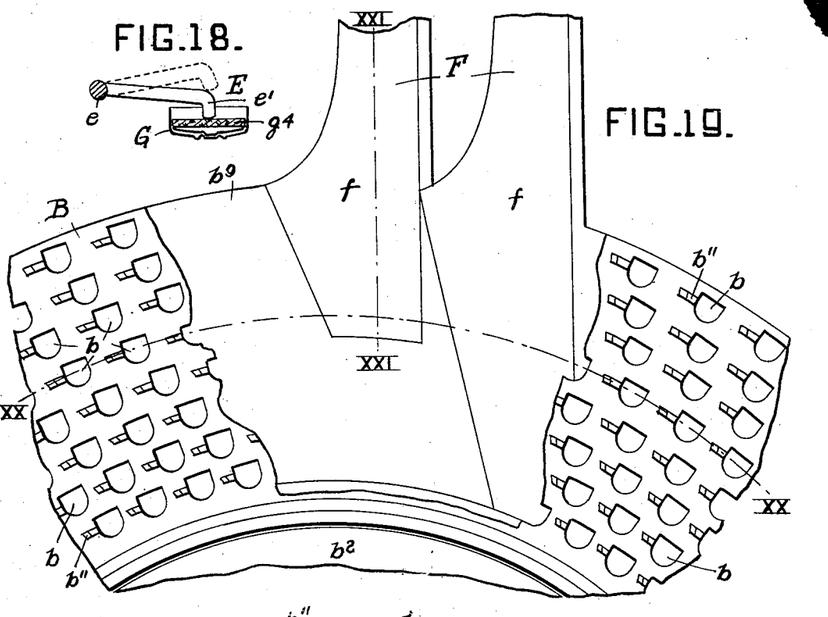
Fig. 18 is a detail sectional view showing the operation of placing the cork disk in the bottom of the cap.
Fig. 19 is an enlarged plan view showing a portion of the rotating table, partly broken away, and the discharge chutes for the completed caps.
Figure 20:
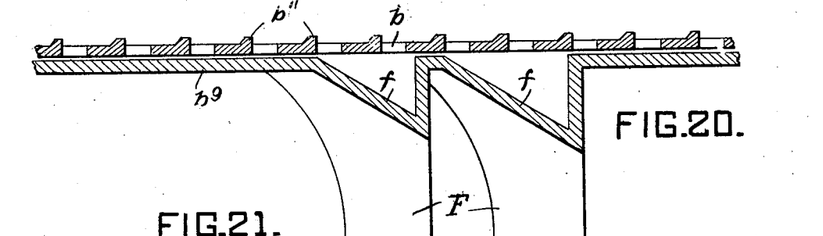
Fig. 20 is a sectional view on the curved line XX. XX. of Fig. 19.
Figure 21:
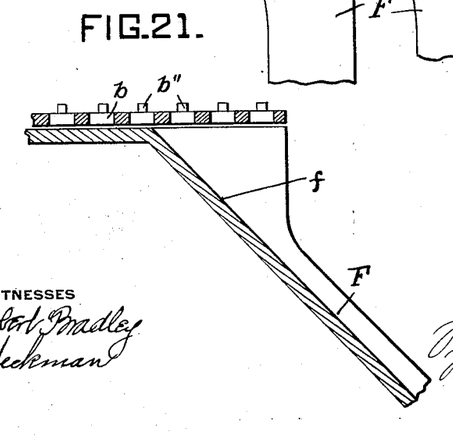
Fig. 21 is a similar section on the line XXI. XXI. of Fig. 19.
Figure 22:
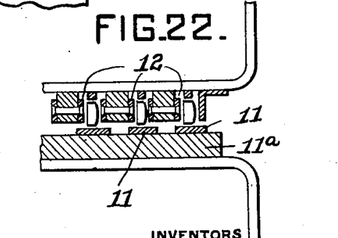
Fig. 22 is a cross section on the line XXII. XXII. of Fig. 4.

Immediately in the rear of each aperture $b$ the table B is provided with an upwardly projecting lug $b^{11}$, the purpose of which is to effect dislodgment or removal of the lowermost cork disk $g^4$, and to effect its positive placement within the receiving cap. For this purpose we provide supporting plates $d^2$ across the under portion of each of the disk hoppers or tubes $d$, extending inwardly at each side thereof, but leaving an intervening clearance opening, sufficient for the free passage of the projecting lug $b^{11}$. Beyond each tube $d$, and arranged at each side of the center thereof, and corresponding in spacing to the supporting plates $d^2$, for clearance of lugs $b^{11}$, are inclined faces $d^3$ adapted to engage against the upper opposite edge portions of each disk, and to thrust it downwardly into the cap, as it is carried along by the projecting lug $b^{11}$. The operation of thus disengaging the cork disks singly from their tubes will be readily understood. As the table revolves intermittently, the lowermost one of each column of disks is positively engaged by the lug, moved outwardly from underneath the next uppermost disk, and is positively placed in position in the cap. The caps now being supplied with cork disks are then brought into register with the series of placing fingers E. These fingers are mounted on a rock shaft $e$, extend outwardly therefrom, and have downwardly directed terminals $e'$ adapted to engage the center of each cork disk and press it downwardly into position within the cap, as in Fig. 18. The series of fingers is arranged in alinement with the row of openings $b$ in the table B, and the rock shaft $e$ is actuated by an operating shaft $e^2$, pitman $e^3$, a bell crank lever $e^4$, and pitman $e^5$ from an eccentric $e^6$ on the main shaft of the disk press C. This mechanism, like the disk punching mechanism, is intended to operate intermittently during the stationary period of the revolving table at the time that the disks are being punched and delivered to the caps, thereby admitting of the operation being completed before the table is again actuated. The disks having been thrust into the caps, the operation continues, and the completed caps containing the cork disks are carried around by the table until each tangential row of openings comes into register with the discharging chutes F. As shown, there are two such chutes (see Fig. 19), one extending inwardly across underneath the area of the revolving table B for one-half of its width, and having the capacity for one-half of the contained caps, the other chute extending across the entire area underneath the revolving table, and adapted to receive the remaining caps of each row. The chutes F incline downwardly and away from the table at one side, as shown, and their bottom walls $f$ also incline downwardly and laterally, so that the caps will fall freely by gravity through the openings $b$ downwardly through the chutes, as soon as they pass off from the supporting surface $b^9$, and will be delivered to the edge grooving machine H. Said machine, while it does not form a material part of the invention, is designed for the purpose of crimping the edge of each cap G, as indicated at $g$, Fig. 3, to fixedly secure the cork disks $g^1$ and the metallic disks $c^2$ within the cap, the operation of attaching the cap to the bottle neck being performed by suitable mechanism, not, however, illustrated in detail.

It will be observed that between the row of pressing fingers E and the point of discharge of the completed caps down chute F the caps will lie in the holding pockets of the table and are visible for a very considerable portion of the step-by-step rotation, affording ample opportunity for inspection and removal of any defective caps by an operator stationed for such purpose.

Figures 4, 5, 6, 7:
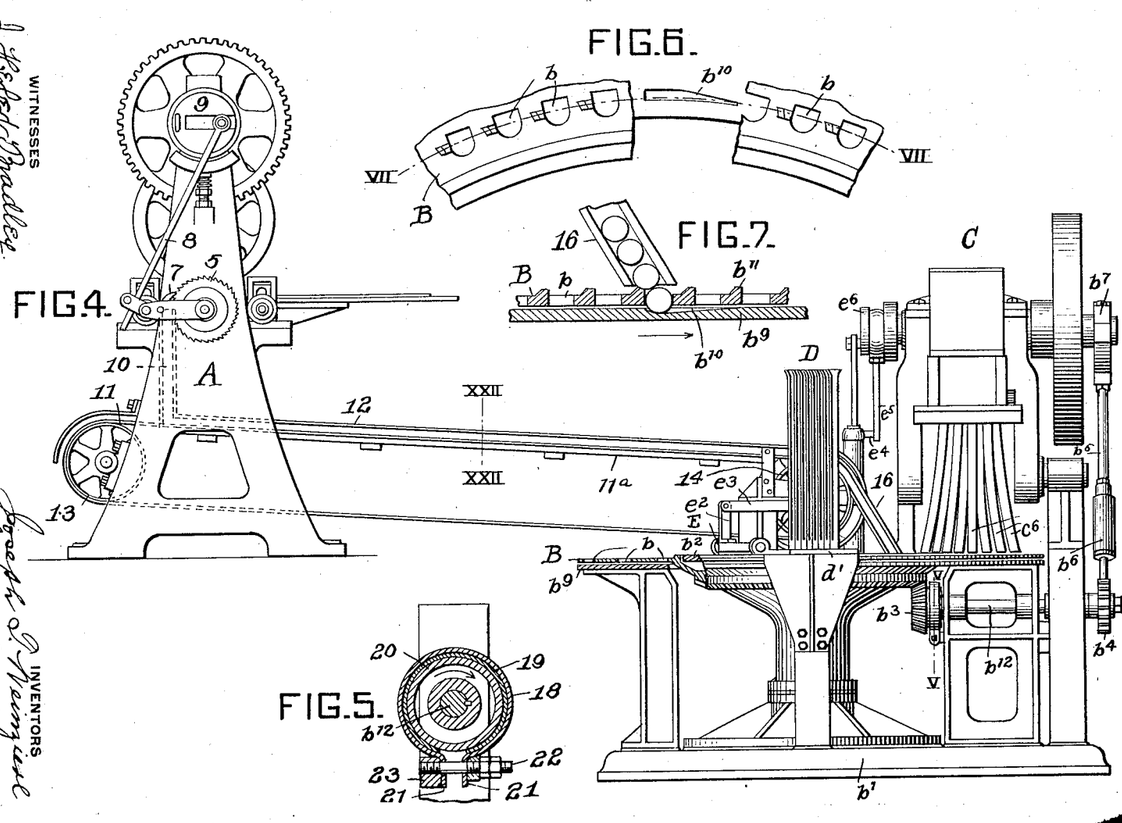
Fig. 4 is a view of the apparatus in elevation.
Fig. 5 is a cross sectional detail view taken on the line V. V. of Fig. 4.
Fig. 6 is a detail plan view, enlarged, showing a portion of the rotatable table and the cap tipping mechanism.
Fig. 7 is a sectional detail view taken on the line VII. VII. of Fig. 6.

For the purpose of controlling the momentum of the machine, we provide a brake band 18 having a friction shoe 19 bearing against a drum wheel 20 secured to the driving shaft $b^{12}$ of bevel pinion $b^3$, the terminals 21 of the brake band being adjusted by a bolt 22 and held against rotation by engagement with an arresting lug 23, as shown in Fig. 5. By this means all excess motion of the table may be easily absorbed and accurately regulated.

What we claim is:

1. In an assembling machine, the combination with a movable table having square ended semi-circular pockets; of guides adapted to deliver caps edgewise into the square ends of said pockets, and means for tipping the caps flat-wise within the pockets, substantially as set forth.

2. In an assembling machine, the combination with a movable table having square ended semi-circular pockets; of means adapted to deliver caps to the table pockets edgewise, means for tipping the caps flat-wise within the pockets, and means adapted to deliver disks to the caps within the table pockets, substantially as set forth.

3. In an assembling machine, the combination with a movable table having pockets; of means adapted to deliver caps to the table pockets edgewise, means to effect tipping of the caps within the pockets open side up, means adapted to deliver disks to the caps within the table pockets, and means for delivering additional packing disks to the caps, substantially as set forth.

4. In an assembling machine, the combination with a movable table having pockets; of means adapted to deliver caps to the table pockets edgewise, means to effect tipping of the caps within the pockets open side up, means adapted to deliver disks to the caps within the table pockets, means for delivering packing disks to the caps, and means for inserting the packing disks within the caps, substantially as set forth.

5. In an assembling machine, the combination with a movable table having pockets; of means adapted to deliver caps to the table pockets edgewise, means to effect tipping of the caps within the pockets open side up, means adapted to deliver disks to the caps within the table pockets, means for delivering packing disks to the caps, means for inserting the packing disks within the caps, and means for automatically receiving the caps from the table, substantially as set forth.

6. In an assembling machine, the combination with a movable table having pockets; of means adapted to deliver caps to the table pockets edgewise, means to effect tipping of the caps within the pockets open side up, means adapted to deliver disks to the caps within the table pockets, means for delivering packing disks to the caps, means for inserting the packing disks within the caps, and a V-shaped inclined chute leading off from underneath the movable table adapted to receive the caps from the table by gravity, substantially as set forth.

7. In an assembling machine having a stationary supporting platform provided with a tipping groove, the combination with a table movable thereover having pockets and projecting lugs and means for intermittently rotating the table; of inclined guides leading to the table adapted to deliver caps to the table pockets edgewise in front of said lugs, and means coöperating with said lugs for placing disks within the caps.

8. In an assembling machine, the combination with a movable table having pockets and projecting lugs and means for intermittently rotating the table; of inclined guides leading to the table adapted to deliver caps to the table pockets edgewise in front of said lugs, means effecting lateral tipping of the caps within the pockets, and means coöperating with said lugs for placing disks within the caps, substantially as set forth.

9. In an assembling machine, the combination with a movable table having pockets and means for intermittently rotating the table; of a conveyer adapted to convey caps vertically edgewise, a guide leading from the conveyer to the face of the table and adapted to deliver caps to the table pockets vertically edgewise, and means for horizontally positioning the caps in said pockets.

10. The combination with a stationary table; of a movable table thereon having perforating pockets and lugs, means for delivering caps into said pockets edgewise, means effecting tipping of the caps open side up within the pockets, means for delivering disks within said caps over said lugs, means coöperating with said lugs for placing disks within the caps, and means for receiving the assembled caps and disks by gravity from underneath the table, substantially as set forth.

11. The combination with a stationary table provided with a tapered tipping groove; of a movable table thereon having perforating pockets adapted to register with said groove and to effect tipping action of the caps, and means for delivering caps into said pockets edgewise in alinement with said groove, substantially as set forth.

12. The combination with a stationary table provided with a tapered tipping groove; of a movable table thereon having perforating pockets adapted to register with said groove and to effect tipping action of the caps, a lug projecting above each pocket, means for delivering caps into said pockets edgewise in alinement with said groove, means for delivering disks within said caps, and means coöperating with said lugs for placing packing disks within the caps over said disks, substantially as set forth.

13. The combination with a stationary table provided with a tapered tipping groove; of a movable table thereon having perforating pockets adapted to register with said groove and to effect tipping action of the caps, a lug projecting above each pocket, means for delivering caps into said pockets edgewise in alinement with said groove, means for delivering disks within said caps, means coöperating with said lugs for placing packing disks within the caps over said disks, and means for automatically receiving the disk-invested caps from the pockets underneath the rotating table by gravity and conveying them away therefrom, substantially as set forth.

14. The combination with a stationary table provided with a tapered tipping groove; of a movable table thereon having perforating pockets adapted to register with said groove and to effect tipping action of the caps within the pockets, means for delivering caps into said pockets, means for delivering and positioning the metallic disks in the caps when they are open side uppermost, means for delivering cork packing disks within the caps over said metallic disks, and means for automatically receiving the disk-invested caps from the pockets underneath the rotating table by gravity and conveying them away therefrom consisting of inclined laterally disposed V-shaped chutes incorporated with the stationary table, substantially as set forth.

15. The combination with a stationary table provided with a tapered tipping groove; of a movable table thereon having partly circular perforating pockets adapted to receive caps edgewise and to move them along the tipping groove whereby they are tipped over toward and into the partly circular portion of the pockets, substantially as set forth.

16. The combination with a stationary table provided with a tapered tipping groove; of a movable table thereon having upwardly projecting lugs, partly circular perforating pockets in front of said lugs adapted to receive caps edgewise and to move them along the tipping groove whereby they are tipped over toward and into the partly circular portion of the pockets open side up, means for delivering disks thereinto over and in front of said lugs, and means coöperating with said lugs for placing disks within the caps, substantially as set forth.

17. The combination with a stationary table provided with a tapered tipping groove; of a movable table thereon having upwardly projecting lugs, partly circular perforating pockets in front of said lugs adapted to receive caps edgewise and to move them along the tipping groove whereby they are tipped over toward and into the partly circular portion of the pockets open side up, means for delivering metallic disks into the pockets over said lugs, and means coöperating with said lugs for delivering cork packing disks into the metallic disks within the caps successively, substantially as set forth.

18. The combination with a stationary table provided with a tapered tipping groove; of a movable table thereon having upwardly projecting lugs, partly circular perforating pockets in front of said lugs adapted to receive caps edgewise and to move them along the tipping groove whereby they are tipped over toward and into the partly circular portion of the pockets open side up, means for delivering metallic disks into the pockets over said lugs, means coöperating with said lugs for delivering cork packing disks into the metallic disks within the caps successively, and means for discharging the disk-invested caps from the machine, substantially as set forth.

19. The combination with a stationary table provided with a tapered tipping groove; of a movable table thereon having upwardly projecting lugs, partly circular perforating pockets in front of said lugs adapted to receive caps edgewise and to move them along the tipping groove whereby they are tipped over toward and into the partly circular portion of the pockets open side up, means for delivering metallic disks into the pockets over said lugs, means coöperating with said lugs for delivering cork packing disks into the metallic disks within the caps successively, and means for discharging the disk-invested caps from the machine consisting of inclined laterally disposed V-shaped chutes incorporated with the stationary table, substantially as set forth.

20. In an assembling machine, the combination with a movable table having pockets; of an endless conveyer having a superimposed guideway provided with a terminal inclined chute leading to the face of the table and adapted to receive, convey and deliver caps vertically edgewise to the pockets thereof, and means for positioning the caps horizontally in said pockets.

21. In an assembling machine, the combination with a movable table having pockets; of an endless conveyer adapted to receive caps vertically edgewise, longitudinal cap guides above the conveyer adapted to maintain the caps vertically edgewise as they are conveyed, a terminal inclined chute adapted to receive the caps from said conveyer and deliver them vertically edgewise to the table pockets and means for positioning the caps horizontally in said pockets.

22. The combination with a stationary supporting bottom and a superimposed disk hopper; of an intervening movable table provided with receiving pockets and abutments adapted to engage and remove the lowermost disk from the hopper, substantially as set forth.

23. The combination with a stationary supporting bottom and a superimposed disk hopper; of an intervening movable table provided with receiving pockets and abutments adapted to engage and remove the lowermost disk from the hopper, and means effecting placement of the disk in the pocket upon further movement of the table, substantially as set forth.

24. The combination with a stationary supporting bottom and a superimposed disk hopper, laterally arranged supporting devices, and an inclined depressing abutment; of an intervening movable table provided with receiving pockets and abutments adapted to successively engage and remove the lowermost disk from the hopper and effect placement of it within the pocket and into a cap therein upon further movement of the table, substantially as set forth.

25. In an assembling machine, the combination with a stationary supporting bottom having an inner annular edge of a given radius; of a circular table movable thereover having series of rows of cap-receiving pockets, the pockets of each row being arranged in a straight line which is at an angle to the radial line of the table passing through any one of the pockets of the row, means for intermittently actuating the table, means for delivering formed caps vertically edgewise and then flatwise into the pockets of each row successively, means for delivering formed disks to the pockets of each row and to the caps therein successively, means for supplying cork disks to the pockets of each row and to the caps therein successively, means for inserting the cork disks in the caps, and means for automatically delivering the disk-invested caps from the machine, substantially as set forth.

26. In an assembling machine, the combination with a stationary supporting bottom having an inner annular edge of a given radius; of a circular table movable thereover having series of rows of cap-receiving pockets, the pockets of each row being arranged in a straight line which is at an angle to the radial line of the table passing through any one of the pockets of the row, means for intermittently actuating the table, means for delivering formed caps vertically edgewise and then flatwise into the pockets of each row successively, means for delivering formed disks to the pockets of each row and to the caps therein successively, means for supplying cork disks to the pockets of each row and to the caps therein successively, means for inserting the cork disks in the caps, and means for automatically delivering the disk-invested caps from the machine consisting of a laterally disposed inclined V-shaped trough incorporated with the table, substantially as set forth.

27. In an assembling machine, the combination with a stationary supporting bottom having an inner annular edge of a given radius and provided with a laterally disposed inclined discharge chute; of a circular table movable thereover having series of rows of cap-receiving pockets, the pockets of each row being arranged in a straight line which is at an angle to the radial line of the table passing through any one of the pockets of the row, means for intermittently actuating the table, means for delivering formed caps vertically edgewise and then flatwise into the pockets of each row successively, means for delivering formed disks to the pockets of each row and to the caps therein successively, means for supplying cork disks to the pockets of each row and to the caps therein successively, and means for inserting the cork disks in the caps, said parts being so arranged as to permit of inspection of the completed caps in the pockets of the table as it is intermittently rotated and to then effect dropping of the caps by gravity as they are carried over the discharge chute, substantially as set forth.

In testimony whereof we hereunto affix our signatures in the presence of two witnesses.

JULIUS STURTEVANT.
JOSEPH T. WEINZIERL.

Witnesses:
W. W. McKNIGHT,
DAVID PENATZER.

Copies of this patent may be obtained for five cents each, by addressing the "Commissioner of Patents, Washington, D. C."